(12) United States Patent
Hamar

(10) Patent No.: US 7,708,204 B2
(45) Date of Patent: May 4, 2010

(54) LASER ALIGNMENT APPARATUS

(75) Inventor: Martin R. Hamar, Wilton, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 996 days.

(21) Appl. No.: 11/345,777

(22) Filed: Feb. 2, 2006

(65) Prior Publication Data

US 2006/0176482 A1 Aug. 10, 2006

Related U.S. Application Data

(60) Provisional application No. 60/650,503, filed on Feb. 7, 2005.

(51) Int. Cl.
*G06K 7/10* (2006.01)

(52) U.S. Cl. .............. 235/462.11; 235/462.24; 235/462.42; 235/462.41

(58) Field of Classification Search ............ 235/462.11, 235/462.2, 462.24, 462.42, 462.41
See application file for complete search history.

(56) References Cited

U.S. PATENT DOCUMENTS

| | | | |
|---|---|---|---|
| 4,468,119 A | 8/1984 | Hamar | |
| 4,714,344 A | 12/1987 | Hamar | |
| 4,844,618 A | 7/1989 | Hamar | |
| 5,090,803 A | 2/1992 | Ames et al. | |
| 5,224,052 A | 6/1993 | Hamar | |
| 5,302,833 A | 4/1994 | Hamar et al. | |
| 5,307,368 A | 4/1994 | Hamar | |
| 5,576,826 A | 11/1996 | Hamar | |
| 5,929,984 A | 7/1999 | Hamar | |
| 6,038,050 A | 3/2000 | Hamar | |
| 6,292,303 B1 | 9/2001 | Hamar | |
| 6,704,115 B1 | 3/2004 | Hamar | |
| 6,825,923 B2 | 11/2004 | Hamar et al. | |
| 2003/0150916 A1* | 8/2003 | Tsikos et al. | ............ 235/454 |
| 2004/0083616 A1 | 5/2004 | Hamar | |

FOREIGN PATENT DOCUMENTS

EP 1 245 926 A2 10/2002

* cited by examiner

*Primary Examiner*—Karl D. Frech
(74) *Attorney, Agent, or Firm*—Gerald E. Hespos; Michael J. Porco

(57) ABSTRACT

A laser alignment system includes a laser emitter for producing at least one fan beam. The laser alignment system further includes a target assembly with at least one CCD linear array. The CCD linear array is disposed to be impinged upon by a portion of the fan beam to provide displacement data. Mirrors are disposed to redirect a portion of the fan beam to a second position on the CCD linear array to provide a second reading. The first and second readings are used to calculate angular alignment data.

6 Claims, 4 Drawing Sheets

LASER ALIGNMENT APPARATUS

This application claims priority on U.S. Provisional Patent Appl. No. 60/650,503, filed Feb. 7, 2005.

BACKGROUND OF THE INVENTION

1. Field of the Invention

The invention relates to an apparatus that employs a laser emitter and a photosensitive target for aligning two objects relative to one another.

2. Description of the Related Art

Laser emitters and photosensitive targets are used widely for aligning objects to one another. The prior art laser emitter projects a straight beam towards the photosensitive target. The prior art target has a two-axis photosensitive cell that precisely identifies the location of the center of energy of the laser beam impinging on the cell. Data from the photosensitive cell can be used directly to quantify X-axis and Y-axis displacement errors between the laser beam and the target. In this context, the X-axis and Y-axis are considered to lie in the plane of the photosensitive cell. Versions of this type of laser alignment apparatus can be purchased in many large hardware stores for roughly the cost of a high quality power tool. Laser alignment devices of this type provide sufficient accuracy for many construction projects, such as the framing of a house or deck or the installation of a brick patio.

The above-described laser apparatus does not provide alignment data. Thus, output from the above-described device will advise the worker or technician whether the target should be moved up, down, left or right, but will not advise the technician or worker whether the plane of the target is aligned at the proper angle to the incoming laser beam. Angular alignment data may not be critical to the worker who is installing a patio or framing a house. However, angular alignment data can be very important in other applications. For example, the couplings of a rotating tool must be positioned properly relative to the X-axis and Y-axis, and also must be aligned to one another along the Z-axis. Similarly, the components of a large plane or ship must meet properly in an X-axis/Y-axis plane, and also must align properly with one another along the Z-axis.

Laser systems are available to calculate both offset and alignment. These systems generally function by using at least one laser with at least one target to obtain positional data at a plurality of known locations. Differences between these positional data then are used with known trigonometric algorithms to quantify alignment data. These known systems provide very precise results. The alignment data permit adjustments that lead to significantly enhanced performance for the apparatus or product that is being aligned. Laser systems that quantify alignment errors are disclosed, for example, in U.S. Pat. Nos. 4,468,119, 5,307,368 and 6,825,923, all of which issued to the inventor herein. The disclosures of these patents are incorporated herein by reference.

The above-described laser systems for measuring both displacement and alignment work extremely well. However, they also are perceived as being too costly. In this regard, the prior art systems for measuring both displacement and angular alignment generally have required plural lasers and plural targets. Some known systems employ optical principles that cause one target to function substantially as two targets. This concept of a "virtual target" is explained in the above-referenced U.S. Pat. No. 4,468,119. Briefly, mirrors are used to direct a laser beam from a first path to a second path where the laser beam will impinge upon a target. Data obtained from the target will be identical to data that would have been obtained if the target was placed along the axis of the original incoming laser beam and at a distance from the laser emitter equal to the sum of the optical distances of the reflected beam. The above-described "virtual target" system can reduce the number of two-axis targets that are needed to measure alignment, and hence can reduce the cost of a laser system. However, there is a demand for a less expensive laser system for measuring both displacement and alignment data.

Some of the inexpensive laser systems for measuring displacement employ a cylindrical lens with the laser emitter. The cylindrical lens functions to spread the incoming linear laser beam into a fan-shaped plane. The angular extent of the fan beam is determined by the optical characteristics of the cylindrical lens. The housing of the laser emitter generally includes manually adjustments and a level so that the fan beam will lie in a substantially horizontal plane. These systems enable a worker to employ several displacement-sensitive targets simultaneously within the range of the fan or to move a single target sequentially from one location to another. These systems, therefore, enable displacement readings to be made at several locations without repositioning the laser emitter. Thus, a carpenter can set up such a laser device so that the fan extends across the extent of a work site, such as the site of a proposed wooden deck. Levelness then can be checked at several locations without repositioning the laser.

Laser bar code scanners and some other optical readers employ a CCD (charge-coupled device) array. A CCD array typically is a linear array of photocells one pixel wide and many pixels long. The linear CCD array identifies the pixel or pixels that are impinged upon by a laser, and hence can identify positional data along the axis of the CCD linear array. CCD linear arrays are much less expensive than the two-axis displacement targets referred to above. However, CCD linear arrays were considered to have very limited applicability in laser alignment systems, and no applicability to laser systems that were intended to identify both displacement and angular alignment errors.

The subject invention was developed to provide a low cost laser system for accurately quantifying displacement and alignment data.

SUMMARY OF THE INVENTION

The invention relates to a laser alignment system that includes at least one laser source and at least one photosensitive target assembly. The laser source preferably includes at least one laser diode and at least one cylindrical lens disposed in the path of the laser beam produced by the laser diode. The cylindrical lens has optical characteristics for converting the incoming laser beam into a generally planar fan. The fan beam preferably transcends a small arc, that typically will be less than 10°. In this regard, the fan beam is not provided to impinge upon a plurality of remote targets, but rather to impinge upon two or more fairly close optical components in a single target assembly.

The photosensitive target assembly includes a housing and at lease one CCD linear array in the housing. Output from the CCD linear array will identify a first energy peak corresponding to the one or more pixels that are impinged upon by the fan beam from the laser source. The target assembly further includes at least one mirror. In this regard, the term mirror refers to an optical component that will reflect at least part of a laser beam impinging thereon. Thus, the term mirror is intended to encompass prisms, such as a penta-prism that accurately reflects a laser beam.

A first mirror may be disposed in the target housing close to, but spaced from, the CCD linear array. More particularly, the first mirror is disposed to be impinged upon by a portion of the fan beam produced by the laser source. Hence, the fan beam will impinge simultaneously upon the CCD linear array and on the first mirror. The target assembly preferably includes at least a second mirror and possible a second and third mirror. The second mirror may is disposed to receive the portion of the laser beam reflected from the first mirror. The second mirror may be aligned to reflect the incoming beam toward the CCD linear array, or towards a third mirror. The third mirror preferably is disposed to receive the laser beam reflected from the second mirror and reflects that beam towards the CCD linear array. As a result, the reflected part of the fan beam will impinge upon the CCD linear array to define a second energy peak spaced from the first energy peak. The second location of impingement of the laser beam on the CCD linear array will provide a reading that will be identical to a reading obtained by a target disposed behind the first mirror at a distance equal to the combined optical distances traveled by the laser beam from the laser source to the second point of impingement of the laser beam on the CCD linear array.

The first reading obtained by the CCD linear array identifies displacement data. The first and second readings of the CCD linear array can be inputs to standard trigonometric algorithms to identify angular alignment data.

CCD linear arrays are much less expensive than the two-axis target cells that typically have been used in better quality laser alignment systems. Hence, the above-described target assembly can produce accurate data at a fraction of the costs of the above-described laser alignment systems designed to provide both displacement and angular alignment data.

The above-described laser alignment system with a single cylindrical lens in the laser emitter and a single CCD linear array in the target assembly provides displacement data along a single axis and alignment data relative to a single rotational axis. However, a more versatile system should provide displacement data along two axes (X-axis, Y-axis) and rotational alignment data about two rotational axes. This more versatile and sophisticated system can employ the above-described components. More particularly, the laser emitter can include two cylindrical lenses aligned orthogonally to one another. The two cylindrical lenses can be disposed to be impinged upon by two separate laser beams or by a laser beam from a single source. For example, the laser emitter can have a beam splitter to divide a single laser beam into two beams for impinging respectively on the two cylindrical lenses. Alternatively, the cylindrical lenses can be stacked relative to the laser beam so that the laser beam passes through a first cylindrical lens and then through a second cylindrical lens. The two orthogonally disposed cylindrical lenses produce two planar fan beams in two perpendicular planes.

In a similar manner, the target assembly can have two CCD linear arrays aligned substantially perpendicular to one another. Additionally, two of the above-described arrays of mirrors can be provided. The first CCD linear array and the first array of mirrors functions to provide displacement data along a first axis and alignment data around a first rotational axis. The second CCD linear array and the second array of mirrors provides displacement data along a second axis and angular alignment data about a second rotational axis. The displacement data produced by the first and second CCD linear arrays can provide X-axis and Y-axis displacement information for the target relative to the laser. The alignment data produced by both outputs on each of the first and second CCD linear arrays can provide rotational data about each of two perpendicular rotational axes (pitch and yaw).

DETAILED DESCRIPTION OF THE PREFERRED EMBODIMENTS

Figure 1:
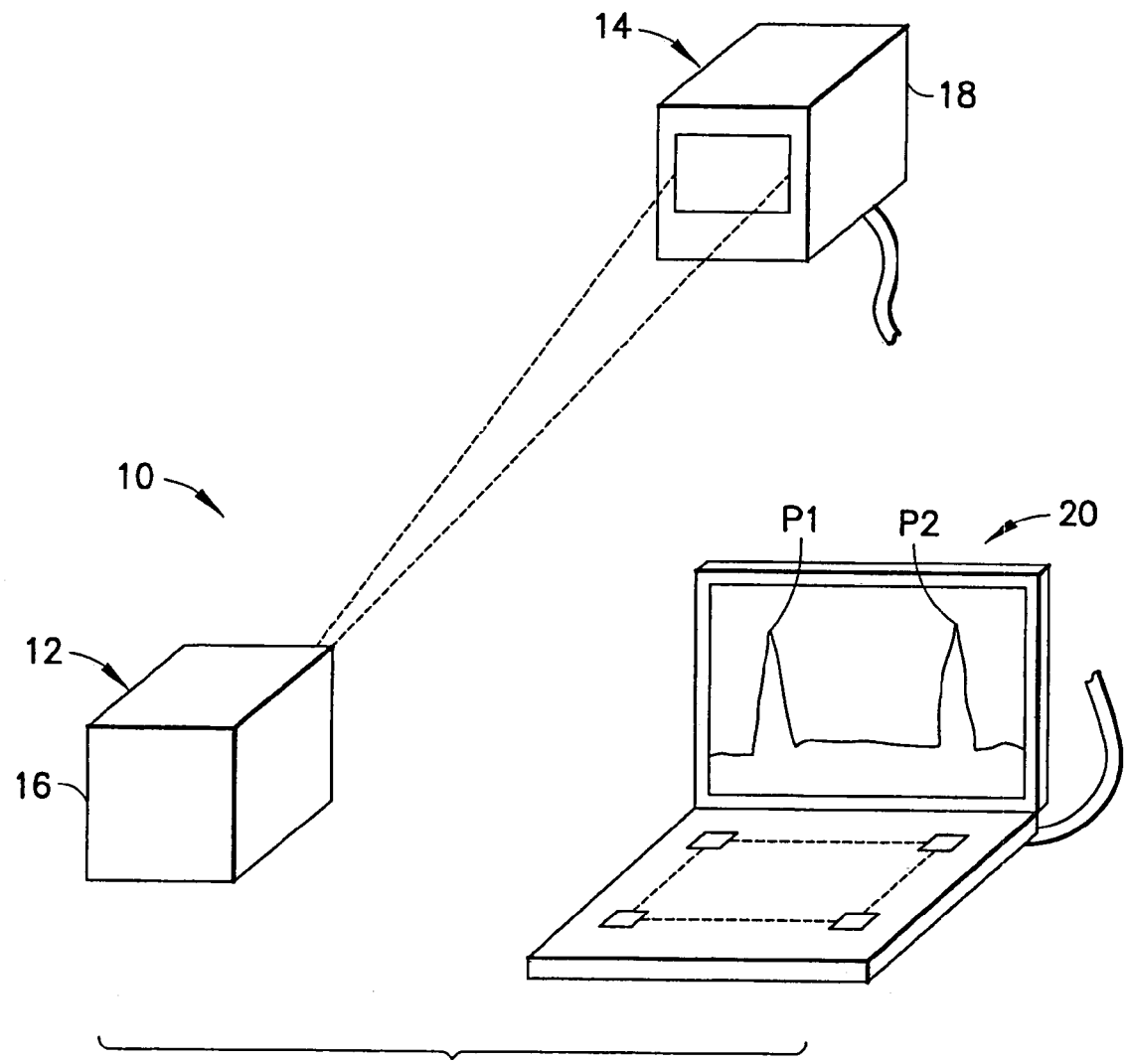
FIG. 1 is a schematic perspective view of a first embodiment of a laser alignment system in accordance with the invention.
Figure 2:
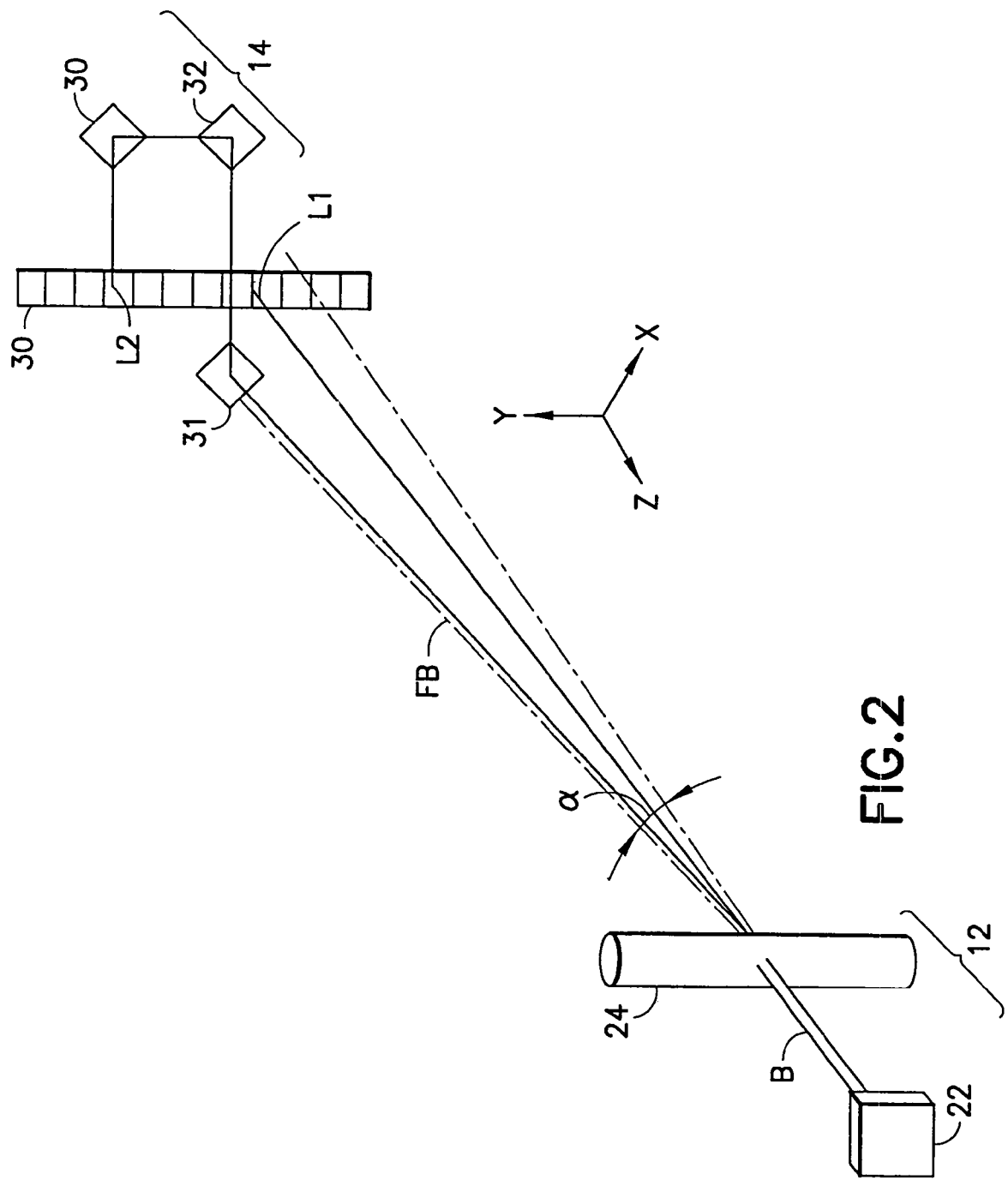
FIG. 2 is a schematic perspective view of the components of the laser alignment system shown in FIG. 1.
Figure 3:
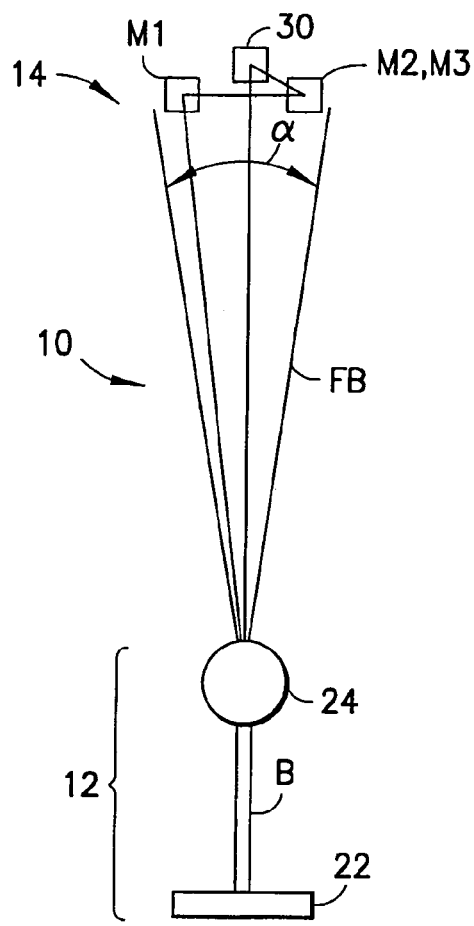
FIG. 3 is a top plan view of the laser alignment system shown in FIG. 1.

A laser alignment system in accordance with a first embodiment of the invention is identified generally by the numeral 10 in FIGS. 1-3. The laser alignment system 10 includes a laser emitter 12 and a laser target assembly 14.

The laser emitter 12 and the target assembly 14 have housings 16 and 18 respectively for conveniently enclosing the electrical and optical components of the system 10. The laser alignment system 10 further includes a controller 20, such as a lap top computer for receiving output data from the target assembly 14 and providing the output data to an operator in a convenient form. In use, the laser emitter 12 and the target assembly 14 are positioned on two objects that are to be aligned relative to one another. The controller 20 typically provides output data in an acceptable form for identifying errors or correction amounts and directions. Thus, fine adjustments can be made to one or both of the objects until an acceptable positional alignment and angular alignment are achieved. The calculations for determining angular alignment information employ basic trigonometric functions as described, for example in U.S. Pat. No. 6,825,923.

The laser emitter 12 includes a diode laser 22 that is operative to produce a laser beam B as shown in FIGS. 2 and 3. The laser emitter 12 further includes a cylindrical lens 24 in a position for being impinged upon by beam B. The cylindrical lens 24 effectively converts the beam B from the laser diode 22 into a fan beam FB. The fan beam FB defines a plane aligned substantially normal to the axis of the cylindrical lens 24. Additionally, the fan beam FB transcends an arc $\alpha$ determined by the optical characteristics of the cylindrical lens 24. In a typical situation, the arc $\alpha$ will be less than 10°, and in most situations, the arc $\alpha$ will be in the range of 4°-5°.

The target assembly 14 includes a CCD linear array 30. More particularly, the CCD linear array 30 may be a commercially available CCD array defining a matrix of one pixel wide and a suitable length. The CCD linear array 30 with 1,280 pixels will be suitable for most alignment systems and can be provided in a small package of less than about 10 cm. The target assembly 14 further includes first, second and third mirrors 31, 32 and 33 respectively. As explained above, the term mirror is intended to identify any optical component that will reflect at least part of the light impinging thereon. Prisms, such as penta prisms, may be employed. The first mirror 31 is mounted slightly offset from the CCD linear array 30, but within the arc $\alpha$. Hence, the first mirror 31 will be impinged upon by a portion of the fan beam FB that also impinges directly upon the CCD linear array 30. The first mirror 31 is aligned to reflect part of the fan beam FB to the second mirror 32. The third mirror 33 is disposed to receive a portion of the fan beam FB reflected from the second mirror 32 and to redirect that portion of the fan beam 32 back towards a CCD linear array 30.

With this design, the fan beam FB will directly impinge upon the CCD linear array 30 at a first location L1. Impingement at the first location L1 will produce a first output peak P1 on the controller 20, as shown schematically in FIG. 1. The first peak P1 will define displacement data along a first axis. In the embodiment of FIGS. 2 and 3, this displacement will be relative to the Y-axis. The reflected fan beam FB will impinge upon the CCD linear array 30 at a second location L2 to produce a second peak P2 on the output of the controller. The second peak P2 can be used in combination with the first peak P1 to identify angular alignment data for the CCD linear array 30 about the X-axis. In this regard, data received from the second location of impingement L2 employs the above-referenced virtual target principles and corresponds to a reading obtained behind the first mirror 31 by a distance equal to the sum of the optical lengths between the mirror 31 and the second point of impingement on the CCD linear array 30. The system 10 provides very accurate displacement and alignment data with a relatively inexpensive assembly of components.

Figure 5:
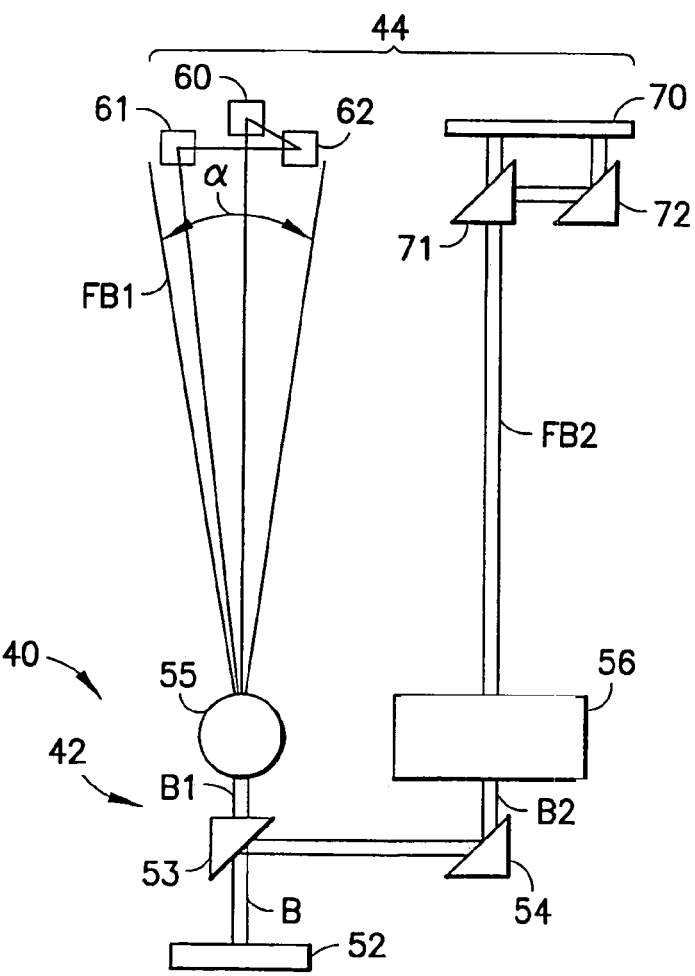
FIG. 5 is a top plan view of the laser alignment system shown in FIG. 4.
Figure 4:
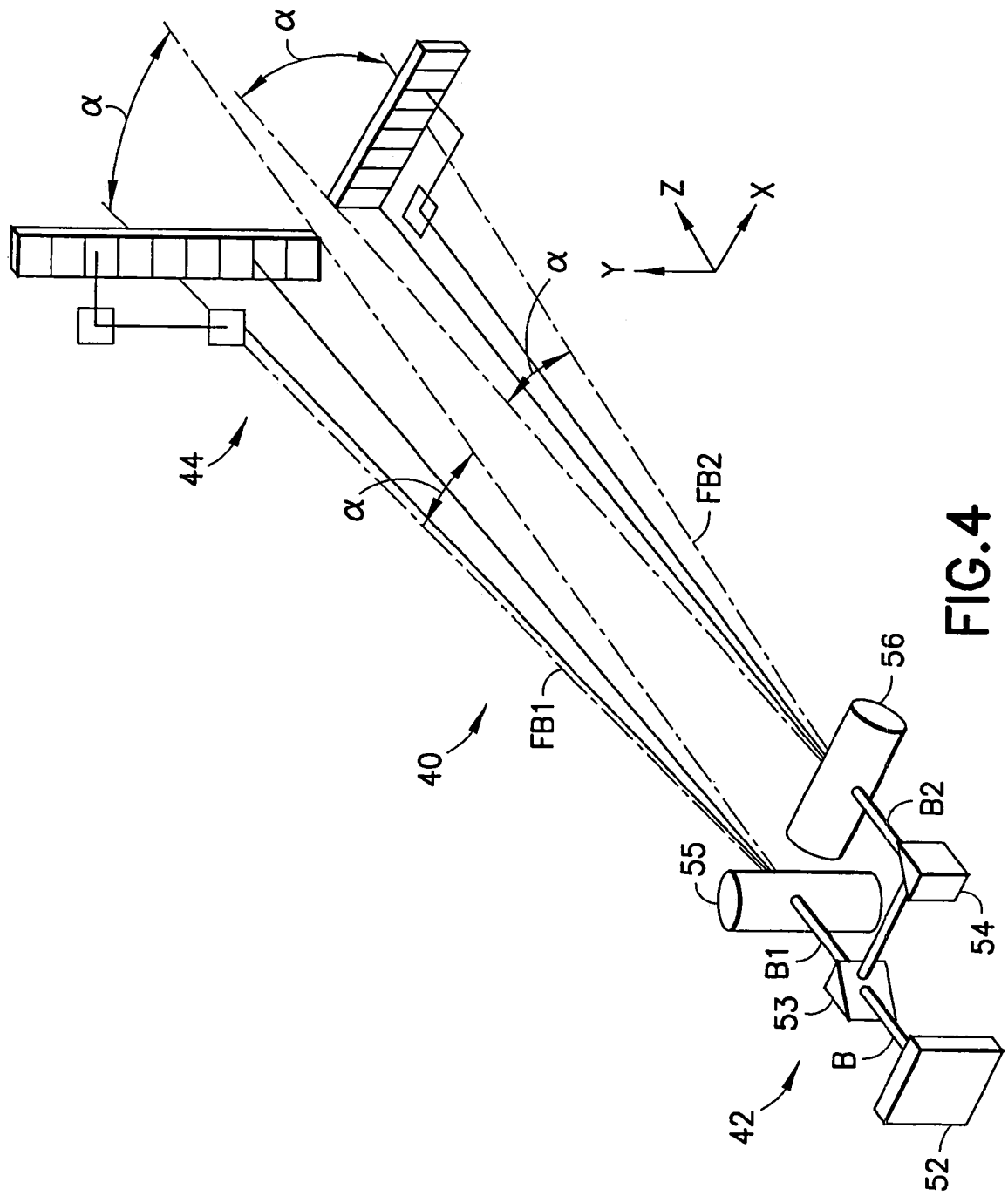
FIG. 4 is a schematic perspective view of the laser alignment system adapted for providing displacement data relative to two axes and rotational data about two rotational axes.

A more versatile version of the system 10 can be provided to yield displacement data relative to two axes and rotational alignment data about two axes. In this regard, FIG. 5 shows a laser alignment system 40 with a laser emitter 42 and a target assembly 44. The laser emitter 42 includes a diode laser 52, a beam splitter 53, a mirror 54 and first and second cylindrical lenses 55 and 56. The beam splitter 53 and mirror 54 function to create two substantially parallel beams B1 and B2 from the beam B. The first and second cylindrical lenses 55 and 56 are aligned perpendicular to one another and in line with the split beams B1 and B2. The same optical effect can be achieved by employing a beam splitter or by employing two diode lasers 52. The first cylindrical lens 55 converts the first beam B1 into a first fan beam FB1 in a first plane. The second cylindrical lens 56 converts the second beam B2 into a second fan beam FB2 defining a plane perpendicular to the plane of the first fan beam FB1. Each fan beam FB1 and FB2 may transcend an angle comparable to the angle of the fan beam FB described above with respect to the first embodiment (e.g., 4°-5°). The target assembly 42 includes a first CCD linear array 60 along with a first array of mirrors 61 and 62. A portion of the first fan beam FB1 will impinge directly upon the first CCD linear array 60 to produce Y-axis output data. A second part of the first fan beam FB1 will reflect off the first array of mirrors 61 and 62 to provide a second output reading in a manner similar to the second output reading of the first embodiment. The first and second outputs produced by the first CCD linear array 60 is subjected to a trigonometric algorithms to provide rotational data about the X-axis.

The target assembly 42 further includes a second CCD linear array 70 aligned substantially perpendicular to the first CCD linear array 60. A portion of the second fan beam FB2 will impinge directly upon the second CCD linear array 62 to provide X-axis displacement data. The target assembly 42 further includes a second array of mirrors 71 and 72 that cooperate so that a portion of the second fan beam FB2 is reflected to provide a second reading from the second CCD linear array 70. The first and second readings from the second CCD linear array 70 are subjected to known algorithms using trigonometric functions to provide rotational alignment data relative to a second axis. Thus, the output data from the target assembly 42 can be used to provide X-axis and Y-axis displacement data as well as pitch and yaw rotational alignment data about two axes.

While the invention has been described with respect to two preferred embodiments, various changes can be made without departing from the scope of the invention as defined by the appended claims. For example, the mirror arrays need not have precisely two or three mirrors. Rather, any number of mirrors can be provided to direct a portion of the fan beam to the CCD linear array at a second location. Additionally, different arrangements can be provided for producing first and second fan beams. For example, two separate diodes can be provided for producing two separate lasers.

What is claimed is:

1. A laser alignment system comprising a laser emitter for emitting a laser beam, at least a first cylindrical lens for converting the laser beam into at least a first fan beam and a target assembly having at least a first CCD linear array for direct impingement by a portion of the fan beam, the target assembly further having at least a first mirror array for redirecting a second portion of the first fan beam through at least one reflection for impinging upon the first CCD linear array at a second location, the laser emitter further being operative for producing a second fan beam, the first and second fan beams defining first and second substantially perpendicular planes.

2. The laser alignment system of claim 1, wherein the laser emitter includes a diode laser.

3. The laser alignment system of claim 1, wherein the first and second fan beams are substantially planar.

4. The laser alignment system of claim 1, wherein the target assembly further includes a second CCD linear array, the first and second CCD linear arrays being aligned substantially normal to one another, the second CCD linear array being disposed for direct impingement by a portion of the second fan beam.

5. The laser alignment system of claim 4, further comprising a second mirror array for redirecting portions of the second fan beam to a second point of impingement on the second CCD linear array.

6. The laser alignment system of claim 1, further comprising a processor for calculating angular alignment data from the first and second outputs of the CCD linear array.

* * * * *